United States Patent
Durairajan et al.

(10) Patent No.: US 10,171,560 B2
(45) Date of Patent: Jan. 1, 2019

(54) MODULAR FRAMEWORK TO INTEGRATE SERVICE MANAGEMENT SYSTEMS AND CLOUD ORCHESTRATORS IN A HYBRID CLOUD ENVIRONMENT

(71) Applicant: International Business Machines Corporation, Armonk, NY (US)

(72) Inventors: Suresh Durairajan, Chennai (IN); Saiprasad Kolluri Venkata Sesha, Bangalore (IN); Sundar Parthasarathy, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 14/589,450

(22) Filed: Jan. 5, 2015

(65) Prior Publication Data

US 2016/0197980 A1 Jul. 7, 2016

(51) Int. Cl.
*H04L 29/08* (2006.01)
*H04W 4/60* (2018.01)
*H04L 12/24* (2006.01)

(52) U.S. Cl.
CPC .......... *H04L 67/10* (2013.01); *H04L 41/0226* (2013.01); *H04L 41/0809* (2013.01);
(Continued)

(58) Field of Classification Search
CPC ......... H04L 67/10; H04L 41/02; H04W 4/003
See application file for complete search history.

(56) References Cited

U.S. PATENT DOCUMENTS 8,261,295 B1 * 9/2012 Risbood ................ G06F 9/4433
717/177
8,396,989 B2 3/2013 Chaturvedi et al.
(Continued)

FOREIGN PATENT DOCUMENTS

WO 2012082726 A2 6/2012
WO 2014021849 A1 2/2014

*Primary Examiner* — Jerry B Dennison
(74) *Attorney, Agent, or Firm* — Robert J. Shatto; Hoffman Warnick LLC

(57) ABSTRACT

A system, method and program product are provided for integrating a plurality of cloud orchestrators and service management (SM) platforms to provide a hybrid cloud environment. A system is disclosed that includes: interface system that includes a first gateway for providing communications with SM platforms that adhere to an SM protocol and a second gateway for providing communications with the plurality of cloud orchestrators, wherein the SM protocol defines a set of management processes for handling service requests; a service request processing system that processes service requests from SM platforms using selected cloud orchestrators, wherein the service request processing system includes a set of management modules in which each management module processes activities associated with of a different one of the management processes; a rules and conditions engine that includes logic to select a cloud orchestrator to be used to service an inputted service request; and a set of data conversion modules, wherein each data conversion module includes logic that converts data associated with an SM platform to a data format required by a one of the cloud orchestrators.

18 Claims, 3 Drawing Sheets

(52) U.S. Cl.
CPC ........... *H04L 41/5041* (2013.01); *H04W 4/60* (2018.02); *H04L 41/0253* (2013.01)

(56) References Cited

U.S. PATENT DOCUMENTS

| | | | |
|---|---|---|---|
| 9,280,683 B1* | 3/2016 | Echeverria | G06F 17/30094 |
| 9,794,117 B2* | 10/2017 | Narasimhan | H04L 41/0806 |
| 2010/0042720 A1 | 2/2010 | Stienhans et al. | |
| 2010/0153482 A1 | 6/2010 | Kim et al. | |
| 2010/0332401 A1* | 12/2010 | Prahlad | G06F 17/30082 |
| | | | 705/80 |
| 2012/0124211 A1 | 5/2012 | Kampas et al. | |
| 2012/0179802 A1* | 7/2012 | Narasimhan | H04L 41/046 |
| | | | 709/223 |
| 2012/0185290 A1* | 7/2012 | Mueller | G06Q 10/06311 |
| | | | 705/7.15 |
| 2012/0204169 A1 | 8/2012 | Breiter et al. | |
| 2013/0066940 A1 | 3/2013 | Shao | |
| 2013/0086411 A1* | 4/2013 | Bauer | G06F 11/2035 |
| | | | 714/3 |
| 2013/0111033 A1 | 5/2013 | Mao et al. | |
| 2013/0179188 A1* | 7/2013 | Hyde | G06Q 10/10 |
| | | | 705/3 |
| 2013/0198050 A1* | 8/2013 | Shroff | H04L 41/5009 |
| | | | 705/34 |
| 2015/0149528 A1* | 5/2015 | Miluzzo | H04L 67/1095 |
| | | | 709/203 |
| 2015/0295731 A1* | 10/2015 | Bagepalli | H04L 12/6418 |
| | | | 370/401 |
| 2016/0048408 A1* | 2/2016 | Madhu | G06F 11/1458 |
| | | | 718/1 |
| 2016/0156527 A1* | 6/2016 | Ha | H04L 41/5009 |
| | | | 709/202 |
| 2016/0170848 A1* | 6/2016 | Yang | G06F 11/2023 |
| | | | 714/4.12 |
| 2016/0182336 A1* | 6/2016 | Doctor | H04L 43/062 |
| | | | 709/224 |
| 2017/0161163 A1* | 6/2017 | Gadish | G06F 11/2094 |

* cited by examiner

MODULAR FRAMEWORK TO INTEGRATE SERVICE MANAGEMENT SYSTEMS AND CLOUD ORCHESTRATORS IN A HYBRID CLOUD ENVIRONMENT

TECHNICAL FIELD

The subject matter of this invention relates to cloud computing, and more specifically to a system and method for integrating service management systems and cloud orchestrators in a hybrid cloud environment.

BACKGROUND

Cloud computing continues to grow as a preferred platform for information technology (IT) solutions. In particular, cloud computing allows enterprises to leverage shared resources in a pay "as you go" model, thus providing flexibility to adjust resources to meet the needs of a particular enterprise.

In a given cloud platform, end-users can access or alter (i.e., provision) available resources such as memory, servers, applications, etc., via an interface provided by a cloud provider or vendor. Cloud platform resources are typically requested with either a Service Management (SM) platform or a Cloud Orchestrator. The Service Management platform provides an end-user interface that essentially sits on top of a Cloud Orchestrator in a one-to-one fashion to handle service requests using industry standard service management protocols. An SM platform ensures compliance with ITIL (Information Technology Infrastructure Library; www.itil.org) standards and is responsible, e.g., for managing service flows, managing user identities, managing change requests, providing task identification, managing group assignments, providing evidence for compliance & audit and forwarding the service request to a Cloud Orchestrator in order to provision the required resources. In the current state of the art, SM platform capabilities generally differ from product to product and vendor to vendor.

The Cloud Orchestrator contains self service catalogs and application program interfaces (APIs) for provisioning resources available in the cloud environment. The Cloud Orchestrator can receive and process provisioning requests directly from an end-user or from the Service Management platform if configured properly. Cloud Orchestrators are however focused mostly around self service catalogs operated directly by the end user. Only minimal service management functionalities are built into Cloud Orchestrators.

One of the challenges with implementing an SM based infrastructure is that many enterprises are trending toward multi-vendor disparate cloud systems (i.e., hybrid cloud environment) in which each vendor has their own Service Management platform and Cloud Orchestrator, each having different business logic and technical viability. Unfortunately, independently managing such an array of processes is tremendously complex when hybrid environment is desired. Current approaches to provide a hybrid cloud environment require manual, labor-intensive methods by enterprises seeking such approaches.

SUMMARY

The present disclosure provides a system and method that implements a modular service management (MSM) framework for providing a hybrid cloud environment. Advantages of the MSM framework include: a highly automated system that eliminates the need for brute force techniques, the ability to seamlessly accommodate disparate multi-vendor cloud systems, a plug and play environment that allows multiple disparate service management platforms to participate, and a platform that provides for the efficient integration of multiple cloud environments against various service management platforms. A first aspect provides a modular service management (MSM) engine that integrates a plurality of cloud orchestrators and service management (SM) platforms to provide a hybrid cloud environment, comprising: an interface system that includes a first gateway for providing communications with SM platforms that adhere to an SM protocol and a second gateway for providing communications with the plurality of cloud orchestrators, wherein the SM protocol defines a set of management processes for handling service requests; a service request processing system that processes service requests from SM platforms using selected cloud orchestrators, wherein the service request processing system includes a set of management modules in which each management module processes activities associated with of a different one of the management processes; a rules and conditions engine that includes logic to select a cloud orchestrator to be used to service an inputted service request; and a set of data conversion modules, wherein each data conversion module includes logic that converts data associated with an SM platform to a data format required by a one of the cloud orchestrators.

A second aspect provides a program product stored on a computer readable medium, which when executed by a computer system, integrates a plurality of cloud orchestrators and service management (SM) platforms to provide a hybrid cloud environment, comprising: program code that implements a first gateway for providing communications with SM platforms that adhere to an SM protocol and a second gateway for providing communications with the plurality of cloud orchestrators, wherein the SM protocol defines a set of management processes for handling service requests; program code that processes service requests from SM platforms using selected cloud orchestrators, and includes a set of management modules in which each management module processes activities associated with of a different one of the management processes; program code that selects a cloud orchestrator to service an inputted service request based on a set of rules and conditions; and program code for implementing a set of data conversion modules, wherein each data conversion module includes logic that converts data associated with an SM platform to a data format required by one of the cloud orchestrators.

A third aspect provides a method for integrating a plurality of cloud orchestrators and service management (SM) platforms to provide a hybrid cloud environment, comprising: providing a first gateway for providing communications with SM platforms that adhere to an SM protocol, wherein the SM protocol defines a set of management processes for handling service requests; providing a second gateway for providing communications with the plurality of cloud orchestrators; processing an inputted service request from an SM platform using a selected cloud orchestrator, wherein the processing utilizes a set of management modules in which each management module processes activities associated with of a different one of the management processes; wherein a rules and conditions engine is utilized to select a cloud orchestrator to service the inputted service request; and wherein the processing utilizes a data conversion module from a set of data conversion modules that includes logic to convert data associated with the SM platform to a data format required by a selected cloud orchestrators.

A fourth aspect provides a method for deploying an application for integrating a plurality of cloud orchestrators and service management (SM) platforms, comprising: providing a computer infrastructure being operable to: provide a first gateway for implementing communications with SM platforms that adhere to an SM protocol, wherein the SM protocol defines a set of management processes for handling service requests; provide a second gateway for implementing communications with the plurality of cloud orchestrators; process an inputted service request from an SM platform using a selected cloud orchestrator, wherein the processing utilizes a set of management modules in which each management module processes activities associated with of a different one of the management processes; wherein a rules and conditions engine is utilized to select a cloud orchestrator to service the inputted service request; and wherein the processing utilizes a data conversion module from a set of data conversion modules that includes logic to convert data associated with the SM platform to a data format required by a selected cloud orchestrators.

BRIEF DESCRIPTION OF THE DRAWINGS

These and other features of this invention will be more readily understood from the following detailed description of the various aspects of the invention taken in conjunction with the accompanying drawings in which.

Figure 1:
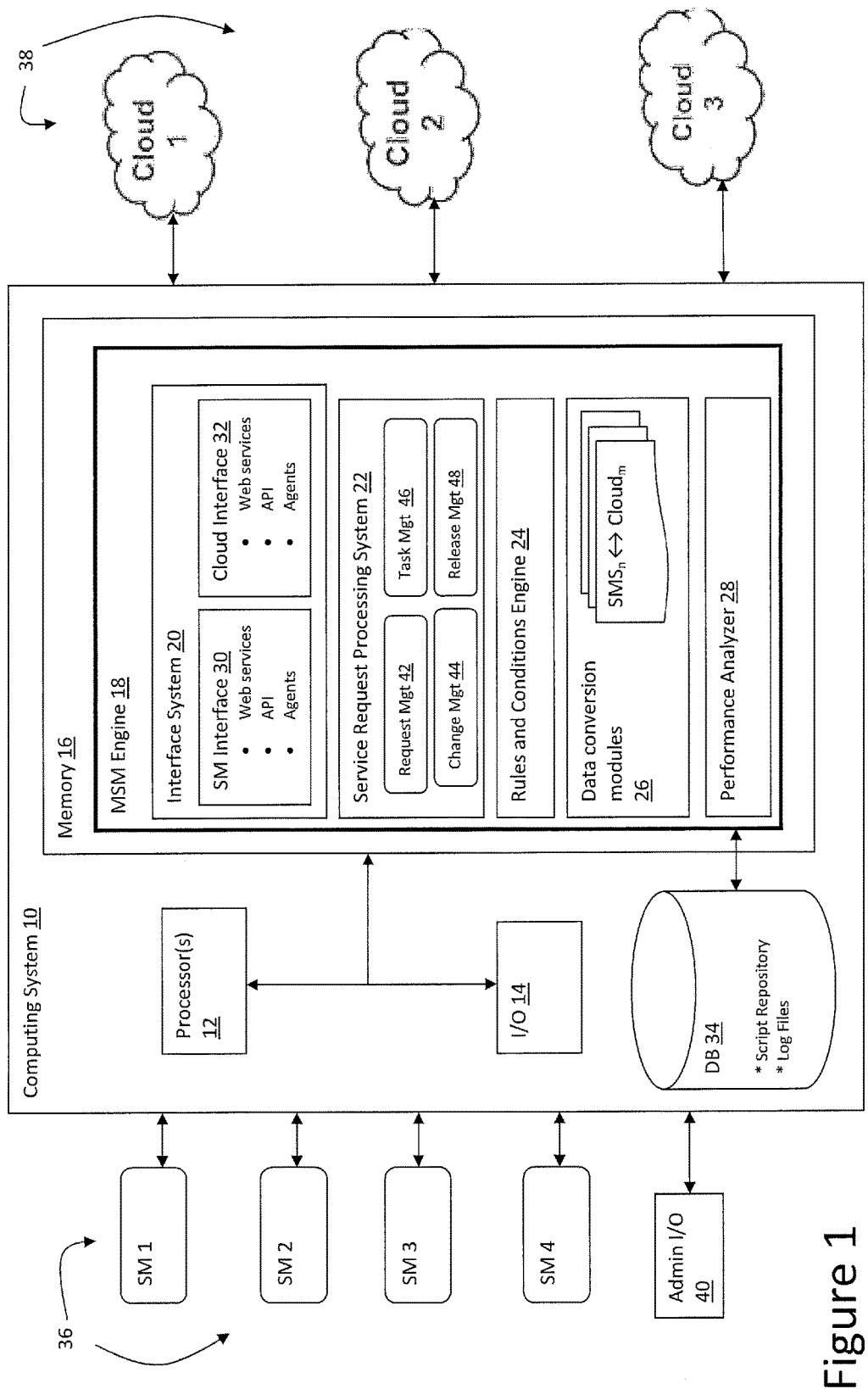
FIG. 1 shows a computing system having a modular service management (MSM) engine according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts an illustrative embodiment of a modular service management (MSM) framework that allows participating service management (SM) platforms 36 to access, modify and utilize (i.e., provision) resources from a set of disparate cloud orchestrators (i.e., cloud environment) 38 via a single access point. The framework includes a computing system 10 that includes an MSM engine 18 stored in memory 16, which when executed by processor(s) 12, implements various systems and processes described herein. The systems and processes interoperate to provide a technical effect of allowing disparate SM platforms 36 to access disparate cloud orchestrators 38 in purely automated fashion.

MSM engine 18 generally includes: an interface system 20 that provides an SM interface 30 and a cloud interface 32; a service request processing system 22 for managing service requests and associated data (referred to herein generally as "service management data") being passed back and forth through the MSM engine 18; a rules and conditions engine 24 for determining which cloud orchestrator 38 should be utilized for a given service request; a set of data conversion modules 26 for mapping data formats of the different SM platforms 36 to data formats of the different cloud orchestrators 38; a performance analyzer 28 for analyzing performance of different cloud orchestrators; and a database 34 for storing associated information, including a script repository, log files of transactions occurring in the MSM engine 18, etc.

As shown, interface system 20 includes two subsystems (SM interface 30 and Cloud interface 32) for handling communications with any participating SM platforms 36 and cloud orchestrators 38, respectively. Each interface may for example include an application programmable interface (API) that allow participating SM platforms 36 and cloud orchestrators 38 to easily "plug-in" to MSM engine 18, e.g., the API provides an open protocol dictating how data is to be communicated. In one embodiment, MSM engine 18 listens to specified network ports using a web services protocol, e.g., REST/SOAP (Representational State Transfer/Simple Object Access Protocol), e.g., at regular intervals of time, for any new service request for the cloud orchestrator 38 that might have been submitted by a participating SM platform 36. Data moving through MSM engine 18 may be transported using agents associated with the SM platforms 36 and cloud orchestrators 38.

Each participating SM platform 36 is implemented to be compliant with an industry standard SM protocol, such as ITIL. Within the ITIL protocol, service requests are handled by each SM platform 36 using a known set of processes, including e.g., Request Management, Change Management, Task Management, and Release Management. Request Management is responsible for communications with end users regarding service requests, Change Management is responsible for ensuring a change service request was created, authorization and forwarded, Task Management is responsible for storing and submitting tasks required by a selected cloud orchestrator to implement the service request, and Release Management is responsible for terminating services.

To effectively manage the processing of SM data flowing between SM platforms 36 and cloud orchestrators 38, service request processing system 22 may be implemented with modular subsystems that mirror an SM industry standard protocol, e.g., ITIL, used by SM platforms 36. Thus, in this embodiment, service request processing system 22 includes subsystems or management module 42, 44, 46, 48 for separately processing Request Management activities, Change Management activities, Task Management activities, and Release Management activities, respectively, associated with multiple SM platforms 36. Thus, each management module is responsible for processing activities associated with a management process defined by an SM industry standard protocol.

This modularity improves the efficacy of the MSM engine 18, and has the technical effect of providing a centralized and virtualized conduit for interacting with multiple SM platforms 36 and cloud orchestrators 38 in a highly automated and modular fashion. For example, change requests from different SM platforms 38 are processed by the Change Management module 44, which may for example store the request in a cache, parse the request, translate the request, forward the request, etc. Request Management module 42 may for example be responsible for detecting new service requests. Task Management module 46 may for example be responsible for managing, tracking and reformatting task related activities for associated service requests. Release Management module 48 may for example be responsible for tracking and managing service termination requests and activities.

Rules and conditions engine 24 determines which cloud orchestrator 38 should handle a given request. In one embodiment, at least a primary and a secondary cloud orchestrator are identified to handle a request. If the primary cloud orchestrator cannot handle the request, then the secondary cloud orchestrator is utilized. In an alternative embodiment, multiple, i.e., more than one, back-up options could be employed.

Different cloud orchestrators 38 may implement different protocols for inputting and outputting data. Data conversion modules 26 provide a mapping for converting data between a given SM platform 36 format and cloud orchestrator formats. Accordingly, each of the "n" participating SM platforms 36 may have "m" different modules 26 which map a given SM platform format to each different cloud orchestrator format. Thus whenever a communication is to be passed between a given SM platform and a selected cloud orchestrator, an appropriate data conversion module would be employed to reformat the data. In an alternative approach, communications may be internally translated into an intermediate universal data format (e.g., using XML—extensible markup language) after being inputted, and retranslated to a target specific format before being outputted.

Various scripts may be stored within a script repository within database 34 that can employed by MSM engine 18 to implement various activities by different cloud orchestrators 38. For example, a given cloud orchestrator 38 may utilize a known script to provision network resources. Additionally, log files may be stored to track activities, errors, etc. A performance analyzer 28 may be utilized to examine log files and other available information to, e.g., rank performance, of each cloud, e.g., based on how many errors occurred, how long processes take, etc.

An administrator interface 40 is provided that allows access to the MSM engine 18 by an administrator, to e.g., add new cloud conversion modules, update scripts, view log files, etc.

Figure 2:
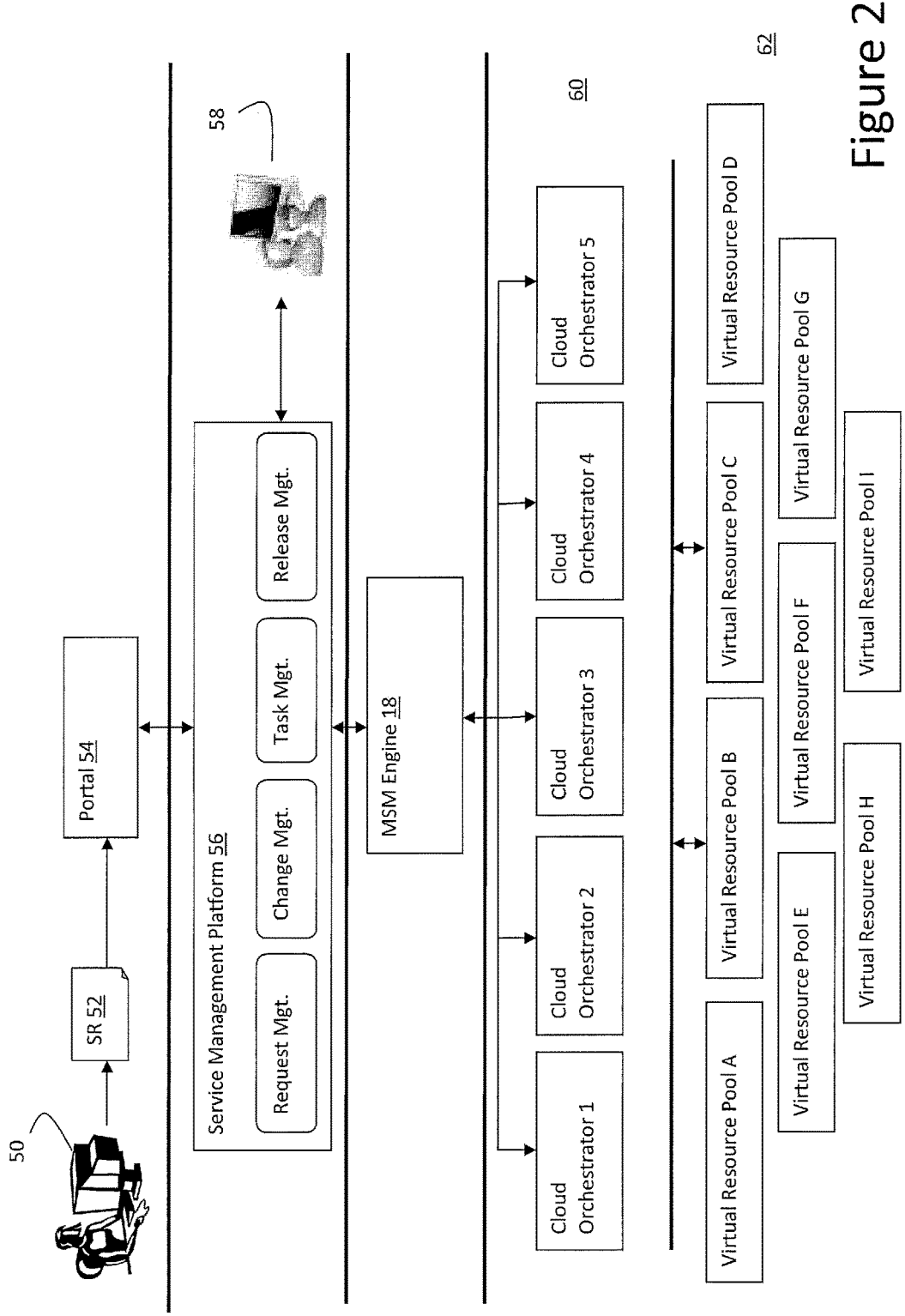
FIG. 2 shows a hierarchical view of an MSM framework according to embodiments.

FIG. 2 depicts a layered view of the MSM framework, in which a user 50 submits a service request (SR) 52 via a portal 54 to a service management platform 56 that employs an industry standard ("standardized") SM protocol. At the service management level, approval groups 58 are utilized to approve change requests submitted by user 50. Beneath the service management platform 56 is MSM engine 18 that provides an adaptive interface for allowing the service request 52 to potentially be handled by different cloud orchestrators 60 at the cloud level 62. Each of the cloud orchestrators 60 in turn has access to a library of virtual resource pools (i.e., services) at the resource level 62 to potentially service the request.

Figure 3:
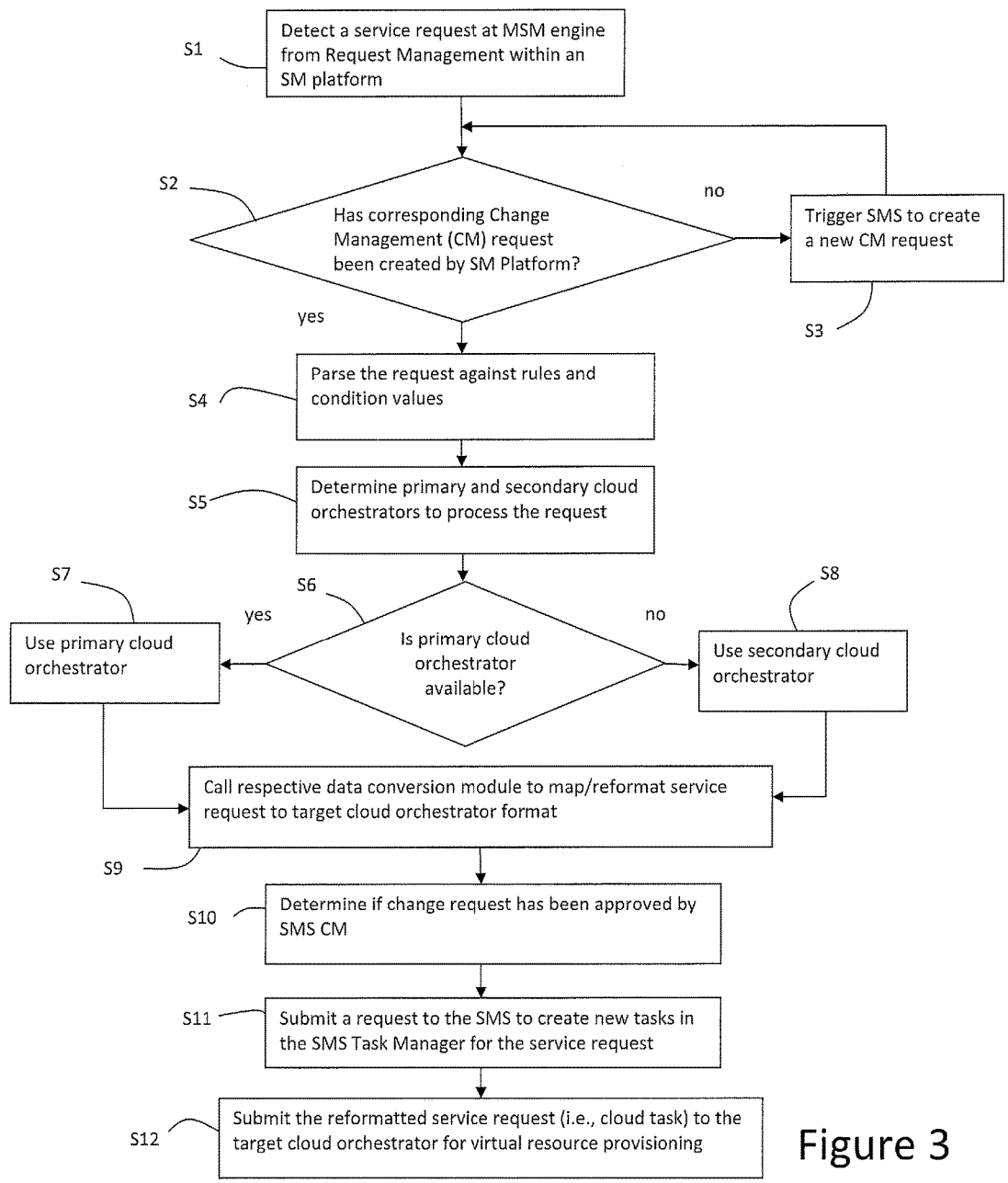
FIG. 3 shows a flow diagram for implementing an MSM process according to embodiments.

FIG. 3 depicts a flow diagram of a process of handling a change management (CM) request coming from a participating SM platform, using MSM engine 18 of FIGS. 1 and 2. At S1, the MSM engine 18 continually listens to one or more specified network ports (e.g., using a web services protocol) for any new service requests submitted by Request Management of an SM platform. When a service request is detected, a determination is made at S2 whether a corresponding CM request has been created by the SM platform.

If the corresponding CM request was not created (no, S2), then the MSM engine 18 will trigger a request for the SM platform to create a new CM request at S3. If the CM request has been created (yes, S2), then the MSM Engine 18 parses the service request against the corresponding set of rules and condition values at S4. Based on the rules and condition values, MSM engine 18 will determine the target primary and secondary cloud orchestrators to process this request at S5.

A check is then made to determine if the primary cloud orchestrator is available at S6, and if so (yes, S6) the primary cloud orchestrator is employed at S7. In the case where the primary cloud orchestrator cannot process the service request (no, S6), then the MSM Engine 18 will redirect the service request to a secondary cloud orchestrator at S8. At S9, MSM Engine 18 will call the respective data conversion module that maps or reformats a defined service management request to the targeted cloud orchestrator input request format. After this, the MSM Engine 18 checks whether the specified change request has been approved at S10. When approved, then the MSM Engine 18 submits a request for creating new tasks in the respective SM platform at S11. Tasks may for example comprise: a virtual resource provisioning task, services activation tasks, compliance and verification tasks, pre-production release tasks, approvals, asset management updates, etc. The MSM Engine 18 will then submit the reformatted service request data as input into the cloud orchestrator for virtual resource provisioning at S12.

Based on the status change in the cloud orchestrator, the MSM Engine 18 constantly updates entries in the respective subsystems of the SM platform. Once the request is processed and the MSM Engine 18 receives a completion status, MSM engine 18 updates and closes the respective SM request item. Dynamic runtime information for each of these actions is stored as logs and evidence by the MSM Engine 18 in a log file.

Referring again to FIG. 1, it is understood that the MSM engine 18 can be implemented as a single, self-contained apparatus, a distributed set of on-premise subsystems, as a cloud-based system or a hybrid of on-premise and cloud. In one embodiment, the MSM engine 18 is itself a cloud-based system for which stakeholders of interest subscribe to a service. The disclosure thus provides industrial applicability in the field of cloud computing.

Furthermore, the present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts an illustrative computing system 10 that may comprise any type of computing device and, and for example includes at least one processor 12, memory 16, an input/output (I/O) 14 (e.g., one or more I/O interfaces and/or devices), and a communications pathway. In general, processor(s) 12 execute program code, such as MSM engine 18, which is at least partially fixed in memory 16. While executing program code, processor(s) 12 can process data, which can result in reading and/or writing transformed data from/to memory and/or I/O 14 for further processing. The pathway provides a communications link between each of the components in computing system 10. I/O 14 can comprise one or more human I/O devices, which enable a user to interact with computing system 10. To this extent, MSM engine 18 can manage a set of interfaces (e.g., graphical user interfaces, application program interfaces, etc.) that enable humans and/or other systems to interact with the MSM engine 18. Further, MSM engine 18 can manage (e.g., store, retrieve, create, manipulate, organize, present, etc.) data using any solution.

Furthermore, it is understood that the MSM engine 18 or relevant components thereof (such as an API component) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will, select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A modular service management (MSM) engine on a computer system including at least one processor that integrates a plurality of cloud orchestrators and service management (SM) platforms to provide a hybrid cloud environment, comprising:
   an interface system that includes a first gateway for providing communications with SM platforms that adhere to an SM protocol and a second gateway for providing communications with the plurality of cloud orchestrators, wherein the SM protocol defines a set of management processes for handling service requests;
   a service request processing system that processes service requests from SM platforms using selected cloud orchestrators, processes change management requests, and matches a change management request corresponding to an inputted service request, wherein the service request processing system includes a set of management modules in which each management module processes activities associated with a different one of the management processes, wherein the set of management modules includes a request management module for detecting an inputted service request, parsing the inputted service request and translating the inputted service request, and managing, tracking, and reformatting at least one activity associated with the inputted service request;
   a rules and conditions engine that parses the inputted service request against a set of rules and conditions values and determines based upon the parsed inputted service request a primary cloud orchestrator to be used to service the inputted service request and a secondary cloud orchestrator to be used as a backup to the primary cloud orchestrator;
   a set of data conversion modules, wherein each data conversion module includes logic that converts data associated with an SM platform to a data format required by one of the primary cloud orchestrator and secondary cloud orchestrator; and
   wherein the set of management modules includes a change management module for checking the approval of the change management request, and a task management module for creating a new task in the SM platform.

2. The MSM engine of claim 1, further comprising a script repository that includes scripts configured to implement tasks by the cloud orchestrators.

3. The MSM engine of claim 1, further comprising a process for generating log files of management process activities.

4. The MSM engine of claim 1, wherein the first gateway includes an application programmable interface (API) that allows SM platforms to connect to the MSM engine, and web services that listens for service requests generated by the SM platforms.

5. The MSM engine of claim 1, wherein the service request includes a request selected from the group consisting of: provisioning memory, provisioning a network, provisioning a server, and provisioning an application.

6. The MSM engine of claim 1, wherein the second gateway utilizes web services or detecting status changes of the cloud orchestrators, and in response to a status change, the second gateway updates a management process of a respective SM platform.

7. A program product stored on a computer readable storage medium, which when executed by a computer system, integrates a plurality of cloud orchestrators and service management (SM) platforms to provide a hybrid cloud environment, comprising:
   program code that implements a first gateway for providing communications with SM platforms that adhere to an SM protocol and a second gateway for providing communications with the plurality of cloud orchestrators, wherein the SM protocol defines a set of management processes for handling service requests;
   program code that processes service requests from SM platforms using selected cloud orchestrators, processes change management requests, and matches a change management request corresponding to an inputted service request, and includes a set of management modules in which each management module processes activities associated with a different one of the management processes, wherein the set of management modules includes a request management module for detecting an inputted service request, parsing the inputted service request and translating the inputted service request, and managing, tracking, and reformatting at least one activity associated with the inputted service request;
   program code that parses the inputted service request against a set of rules and conditions values and determines based upon the parsed inputted service request a primary cloud orchestrator to be used to service the inputted service request and a secondary cloud orchestrator to be used as a backup to the primary cloud orchestrator;
   program code for implementing a set of data conversion modules, wherein each data conversion module includes logic that converts data associated with an SM platform to a data format required by one of the primary cloud orchestrator and secondary cloud orchestrator; and
   program code for implementing, from the set of management modules, a change management module for checking the approval of the change management request, and a task management module for creating a new task in the SM platform.

8. The program product of claim 7, further comprising program code for implementing a script repository that includes scripts configured to implement tasks by the cloud orchestrators.

9. The program product of claim 7, further comprising program code for generating log files of management process activities.

10. The program product of claim 7, wherein the first gateway includes an application programmable interface (API) that allows SM platforms to connect to the MSM engine, and web services that listens for service requests generated by the SM platforms.

11. The program product of claim 7, wherein the service request includes a request selected from the group consisting of: provisioning memory, provisioning a network, provisioning a server, and provisioning an application.

12. The program product of claim 7, wherein the second gateway utilizes web services for detecting status changes of the cloud orchestrators, and in response to a status change, the second gateway updates a management process of a respective SM platform.

13. A method for integrating a plurality of cloud orchestrators and service management (SM) platforms to provide a hybrid cloud environment, comprising:
providing a first gateway for providing communications with SM platforms that adhere to an SM protocol, wherein the SM protocol defines a set of management processes for handling service requests;
providing a second gateway for providing communications with the plurality of cloud orchestrators;
processing an inputted service request from an SM platform using a selected cloud orchestrator,
wherein the inputted service request processing utilizes a set of management modules in which each management module processes activities associated with a different one of the management processes, wherein the set of management modules includes a request management module for detecting an inputted service request, parsing the inputted service request and translating the inputted service request, and managing, tracking, and reformatting at least one activity associated with the inputted service request;
wherein a rules and conditions engine is utilized to parses the inputted service request against a set of rules and conditions values and determines based upon the parsed inputted service request a primary cloud orchestrator to be used to service the inputted service request and a secondary cloud orchestrator to be used as a backup to the primary cloud orchestrator;
wherein the processing utilizes a data conversion module from a set of data conversion modules that includes logic to convert data associated with the SM platform to a data format required by one of the primary cloud orchestrator and secondary cloud orchestrator;
processing change management requests and matching a change management request corresponding to an inputted service request; and
processing, from the set of management modules, a change management module for checking the approval of the change management request, and a task management module for creating a new task in the SM platform.

14. The method of claim 13, wherein the processing generates a log file of management process activities associated with provisioning the service request.

15. The method of claim 13, wherein the first gateway includes an application programmable interface (API) that allows SM platforms to connect to the MSM engine, and web services that listens for service requests generated by the SM platforms.

16. The method of claim 13, wherein the service request includes a request selected from the group consisting of: provisioning memory, provisioning a network, provisioning a server, and provisioning an application.

17. The method of claim 13, wherein the second gateway utilizes web services for detecting status changes of the cloud orchestrators, and in response to a status change, the second gateway updates a management process of a respective SM platform.

18. A method for deploying an application for integrating a plurality of cloud orchestrators and service management (SM) platforms to provide a hybrid cloud environment, comprising:
providing a computer infrastructure being operable to:
provide a first gateway for implementing communications with SM platforms that adhere to an SM protocol, wherein the SM protocol defines a set of management processes for handling service requests;
provide a second gateway for implementing communications with the plurality of cloud orchestrators;
process an inputted service request from an SM platform using a selected cloud orchestrator,
wherein the inputted service request processing utilizes a set of management modules in which each management module processes activities associated with a different one of the management processes, wherein the set of management modules includes a request management module for detecting an inputted service request, parsing the inputted service request and translating the inputted service request, and managing, tracking, and reformatting at least one activity associated with the inputted service request;
wherein a rules and conditions engine is utilized to parses the inputted service request against a set of rules and conditions values and determines based upon the parsed inputted service request a primary cloud orchestrator to be used to service the inputted service request and a secondary cloud orchestrator to be used as a backup to the primary cloud orchestrator;
wherein the processing utilizes a data conversion module from a set of data conversion modules that includes logic to convert data associated with the SM platform to a data format required by one of the primary cloud orchestrator and secondary cloud orchestrator
process change management requests and matching a change management request corresponding to an inputted service request; and
process, from the set of management modules, a change management module for checking the approval of the change management request, and a task management module for creating a new task in the SM platform.

* * * * *